United States Patent [19]
Baldocchi

[11] 3,785,564
[45] Jan. 15, 1974

[54] APPARATUS FOR TREATING ROWS OF PLANTS WITH OVERLAPPING BRANCHES

[76] Inventor: Archie Baldocchi, Edificio Rivas Cierra A Calle Arce 707, San Salvador, El Salvador

[22] Filed: July 7, 1972

[21] Appl. No.: 269,532

[52] U.S. Cl. ............... 239/172, 239/184, 47/1.7, 172/2, 172/26
[51] Int. Cl. ... B05b 3/18, A01g 25/00, A01c 23/00
[58] Field of Search ..... 239/146–148, 172, 173, 184; 172/2, 26; 47/1.7

[56] References Cited
UNITED STATES PATENTS

| | | | |
|---|---|---|---|
| 559,042 | 4/1896 | Potter | 47/1.7 UX |
| 3,468,379 | 9/1969 | Rushing et al. | 172/2 |
| 1,348,038 | 7/1920 | Neumeyer | 47/1.7 |
| 2,880,937 | 4/1959 | King | 47/1.7 UX |
| 3,144,723 | 8/1964 | Carter | 172/2 X |
| 3,322,350 | 5/1967 | Heinicke et al. | 239/172 |
| 3,537,531 | 11/1970 | Fischer et al. | 172/26 |
| 3,548,966 | 12/1970 | Blacket | 172/26 |
| 3,683,547 | 8/1972 | Harden | 47/1.7 |

FOREIGN PATENTS OR APPLICATIONS

| | | | |
|---|---|---|---|
| 42,371 | 11/1965 | Germany | 239/172 |
| 489,066 | 8/1918 | France | 47/1.7 |

OTHER PUBLICATIONS
"Farm Implement and Machinery Review," (periodical) pp. 985 and 986. November 1, 1960.

Primary Examiner—Robert S. Ward, Jr.
Attorney—George B. White

[57] ABSTRACT

Traction equipment of limited height capable of traveling between rows of plants and under the lowermost overlapping branches of the plants in the adjacent rows carries or pulls a dispensing device also of limited height to spray under pressure a suitable substance for the treatment of the plants under sufficient pressure to reach the trunk and foliage of said plants, guiding means are provided so as to feel the opposite plants or the sides of the furrow or ditch therebetween so as to cause the turning of the wheels of the traction apparatus so as to follow the direction of the furrow or the ditch. The device has a suitable pump and conduits which are valve controlled, and has suitable servo motors for operating the driving mechanism at a desired speed and also for operating the pump and controlling the valve for the spraying liquid. Remote control devices such as selected tone transmitter from control tone generators and suitable actuating tone receiver on the tractor and the apparatus, may be provided to permit the operation of the device from a remote location such as a tower overlooking the entire field on which the rows of plants are located.

7 Claims, 12 Drawing Figures

PATENTED JAN 15 1974 3,785,564
SHEET 1 OF 4
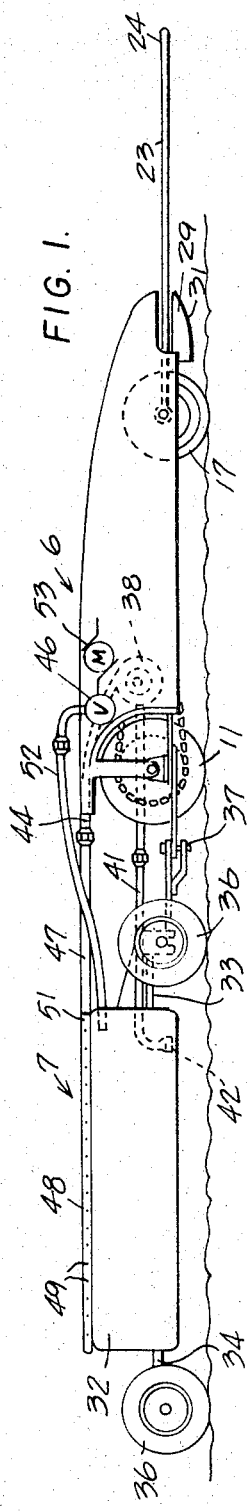
FIG. 1.
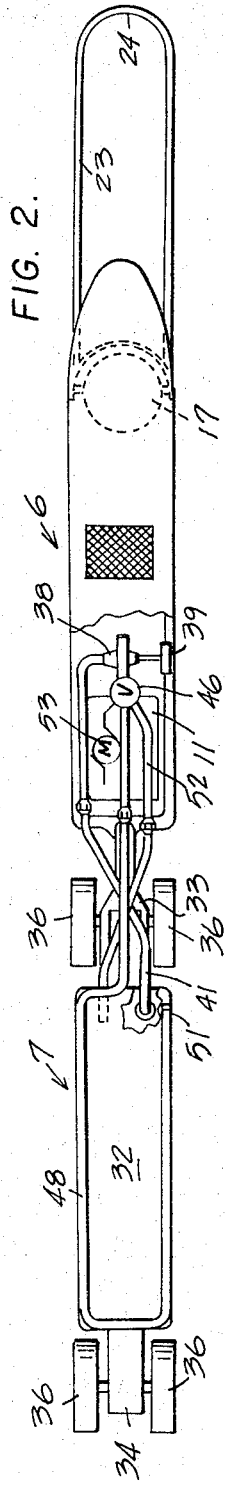
FIG. 2.
FIG. 4.
FIG. 3.

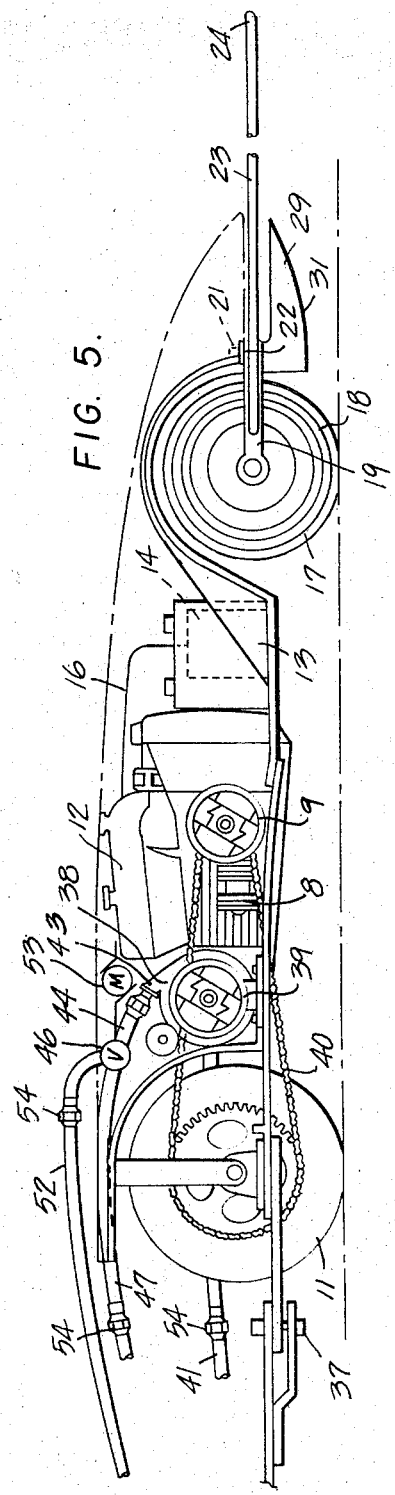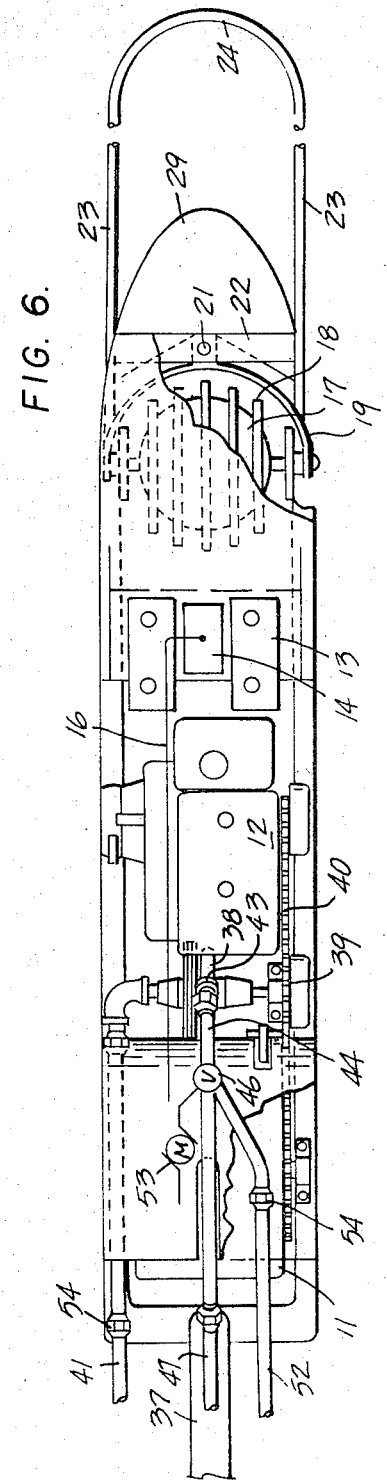

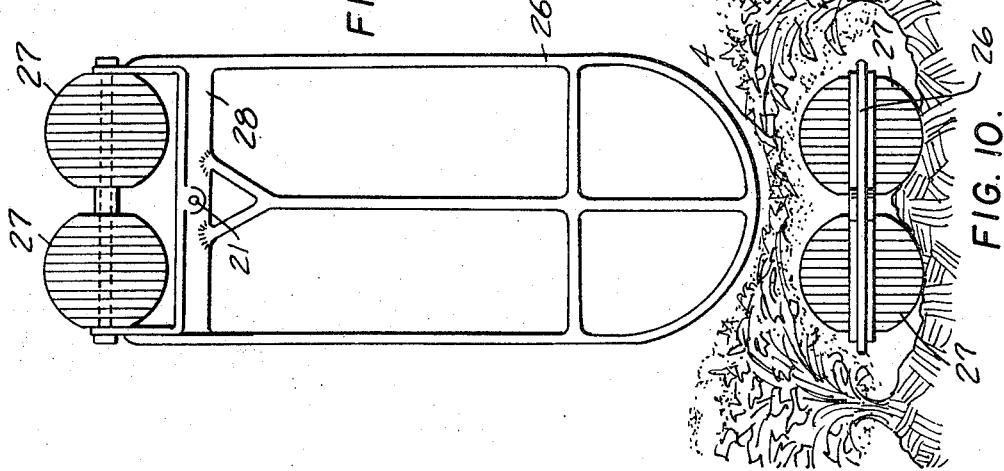
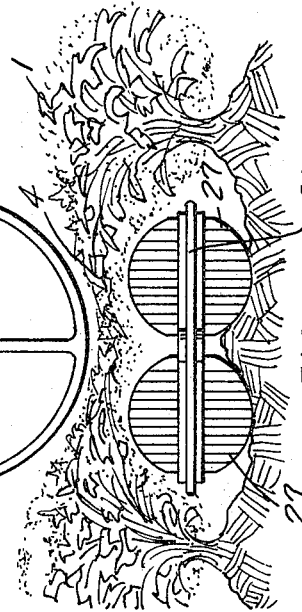
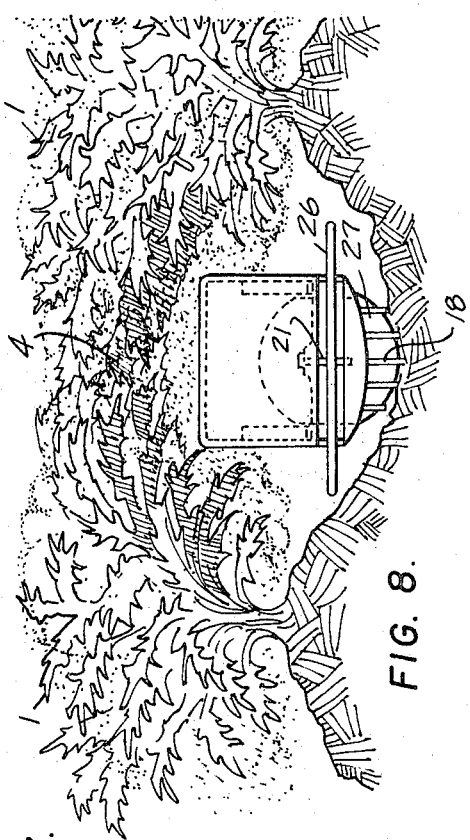
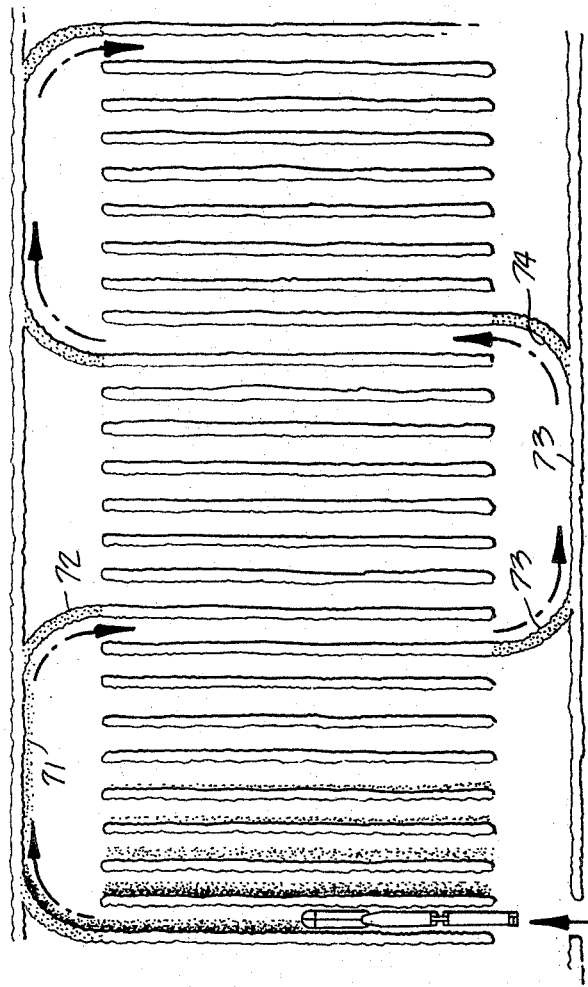

APPARATUS FOR TREATING ROWS OF PLANTS WITH OVERLAPPING BRANCHES

BACKGROUND OF THE INVENTION

The long standing problem of treating low growing plants wherein the foliage is close to the ground, has not been solved by the prior art known to applicant. There were spraying devices beginning, for instance, with the Potter spraying device, U.S. Pat. No. 559,042 of 1896, in which the device is dragged on the ground by means of a comparatively tall wheeled cart, or the Strickland U.S. Pat. No. 2,985,379 of 1961 in which a Self-Propelled Row Crop Sprayer of considerable super structure is provided with a plurality of downwardly directed nozzles over several rows of plants, or Ripper U.S. Pat. No. 2,941,753 of 1960 employing aerial spraying of land or crops. Applicant is also aware of irrigation systems such as Purtell U.S. Pat. No. 3,094,282 of 1963 whereby the sprinklers on a slab are pulled by ropes or cables to various locations. Applicant is also aware of Kohls U.S. Pat. No. 3,322,225 of 1967 pertaining to forward and reverse guidance control for vehicles, none of which in actual practice solve the problem of properly treating rows of plants of low foliage close to the ground, and also Self Guiding and Riding Cultivator, such as Stewart U.S. Pat. No. 1,626,888 of 1927 and Automatic Steering Apparatus of Knight, U.S. Pat. No. 1,868,360 of 1932.

Plants, like cotton, overlap and form a tunnel between the rows which are so low that usually it would not admit a person or any of the types of dispensing machines shown in the prior art. The tunnel formed by the plants is only about twenty inches high and most of the insects live and flourish in the lower portions of the plants which heretofore were not accessible for being sprayed or treated speedily.

The primary object of this invention is to provide a traction and dispensing unit, either on the same frame or coupled together, which are of a height lower than the usual tunnel formed by the overlapping lower branches of the rows of plants and which are elongated and narrow to be capable of traveling between the walls or sides of the usual furrows or ditches between the rows of such low foliage plants.

A further object of the invention is to provide such units so that they are self-propelled and self-operated and which are adapted to be controlled and actuated from a remote point quickly and efficiently, thereby to eliminate the need for any manual action or operation at the location of the plants or in the furrows or ditches.

BRIEF DESCRIPTION OF DRAWINGS

FIG. 1 is a side view of a preferred form of the apparatus.

FIG. 2 is a top plan view of the apparatus shown in FIG. 1.

FIG. 3 is a diagrammatic view showing the apparatus in a furrow between two rows of low plants.

FIG. 4 is a perspective view showing the spraying portion of the apparatus.

FIG. 5 is a side view on a somewhat enlarged scale of the driving mechanism of the apparatus.

FIG. 6 is a top plan view of the parts of the apparatus shown in FIG. 5.

FIG. 7 is a diagrammatic view illustrating the selective travel of the apparatus in spaced furrows.

FIG. 8 is an end view showing a modified form of somewhat higher unit.

FIG. 9 is a top plan view of a unit with double-ball front wheels.

FIG. 10 is a view showing the double-ball unit in the furrow between the rows of plants.

DETAILED DESCRIPTION

Figure 11:
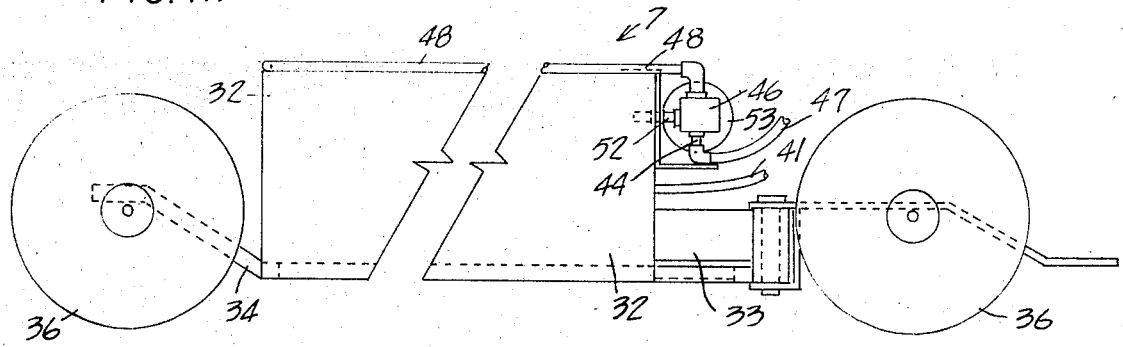
FIG. 11 is a fragmental view of the dispenser unit showing the location of the 3-way valve and servo motor for operating it.

Low growing plants 1 as shown in FIG. 3 form a tunnel 2 above the usual furrow 3 between adjacent rows of plants. The branches and foliage 4 overhang the furrow 3 and this leaves very low space along the furrow.

A low, self-propelling driving unit 6 carries or pulls a similarly low dispensing or spraying unit 7. The entire assembly is of a height lower than the tunnel formed by the overhanging foliage in the furrow and it is elongated to accommodate the various devices. The average tunnel formed by the overhanging branches and foliage 4, in the case of cotton plants for instance, is on the average about twenty inches high and the driving unit 6 and dispensing unit 7 are elongated so as to provide stability for travel in the direction of the furrow without damaging the overhanging branches and foliage 4.

The driving unit 6 (as shown in FIG. 5 particularly), includes an engine 8 with the usual transmission 9 to drive the traction wheels 11. A fuel tank 12 is provided for the engine 8. The transmission 9 is of a chain and sprocket type. A suitable battery 13 is provided near the engine 8. A receiver and control unit 14, to be hereinafter described in relation to FIG. 12, has a rearwardly extended preferably horizontal antenna 16 for receiving remote control signals for the operation of the engine 8.

The steering of the front wheel 17 of the driving unit is so accomplished that it is self-steering or straightening to travel in the middle of the furrow 3. The front wheel 17 may be spherical as shown in FIG. 6, with a series of ribs 18 which ribs 18 in the straight-forward position are parallel with the axis of the driving unit 6. The wheel 17 is supported on a yoke 19 which latter is pivoted on a fulcrum 21 on the front transverse bar 22. A feeler loop 23 is secured to the yoke 19 and extends considerably forward of the front end of the driving unit 6, and is substantially of the width of said driving unit 6, so that as the curved leading end 24 of the loop 23 on either of its sides engages the respective bank of the furrow 3 it will turn the wheel back toward the center of the furrow. The wheel 17 as supported on the yoke 19 functions substantially as a caster for easy turning and due to the directional effect of the ribs 18 the steering is positive. The forward end 24 of the feeler loop 23 is preferably at a distance from the forward end of the driving unit 6 equal or longer than the body of the driving unit 6 so as to provide sufficient leverage and also to enable it to turn the wheel 17 before the sides of the body of the unit 6 touch the bank of the furrow 3.

In the form shown in FIGS. 9 and 10 the feeler loop 26 is wider than the width of the frame and there are two ribbed wheels 27 supported on the yoke 28.

A guide abutment 29 is fixed on the front cross bar 22 of the frame and extends below the cross bar 22. The sides of this guide abutment converge forward to form a rounded apex and the bottom 31 of the guide abutment 29 is also curved forwardly and upwardly into said apex so as to be capable of riding over rocks or obstacles and lift the front end of the unit to facilitate riding over the same.

The spraying unit 7 may be mounted on the same frame as the riding unit 6, but in the preferred form herein it includes a tank 32 supported on a forward frame extension 33 and a rearward frame extension 34 which in turn are supported on wheels 36. The front frame extension 33 is connected to the frame of the driving unit 6 by a suitable hitch 37 indicated in FIG. 5.

In either form the tank is connected to a pump 38 which forces the liquid treating substance from the tank 32 out through suitable nozzles for spraying. The pump is driven by a suitable sprocket 39 which is driven by the chain 40 of the transmission 9 which drives the traction wheels 11. Thus the pump is in operation continuously during the operation of the engine 8.

As shown in FIGS. 1, 4, 5 and 11, the pump intake pipe 41 has its intake 42 near the bottom of the tank 32 and leads to the usual intake of the pump 38. The outlet 43 of the pump is connected to an outlet pipe or hose 44 which leads into a 3-way valve 46. The outlet hose 44 is the intake of the valve 46 while the valve has two outlets, one outlet being connected to a feed pipe or hose 47 which leads into a sprayer pipe 48, which latter has a plurality of nozzle apertures 49 so that the liquid under pressure sprays out in all directions. The spraying pipe is around the edge or contour of the top of the tank 32 and its free end 51 is plugged or closed as shown in FIG. 4. To the other outlet port of the 3-way valve 46 is connected a by-pass pipe or hose 52 which leads back into the tank 32 above its fluid level. A servo motor 53 is operated by remote control in the manner to be hereinafter described for turning the 3-way valve 46 either to feed liquid from the pump 38 to the outlet hose 44 and to the sprayer pipe 48, or to the by-pass hose 52, according to whether spraying is desired or not at the particular area where the unit travels at the moment. Another position of the 3-way valve 46 is shown on FIG. 11 where the valve is directly mounted next to the tank 32 together with its servo motor 53 and the pump outlet hose 44 is connected to the lower intake port of the valve 46, and the feeder outlet of the valve 46 is connected to a short feed pipe 47 and to the spraying pipe 48. The shorter by-pass pipe 52 is connected directly to the by-pass outlet of the 3-way valve 46. The pump intake pipe 41 extends from the tank 32, as shown in FIG. 11. The various pipes or hoses are connected by suitable couplings 54.

Figure 12:
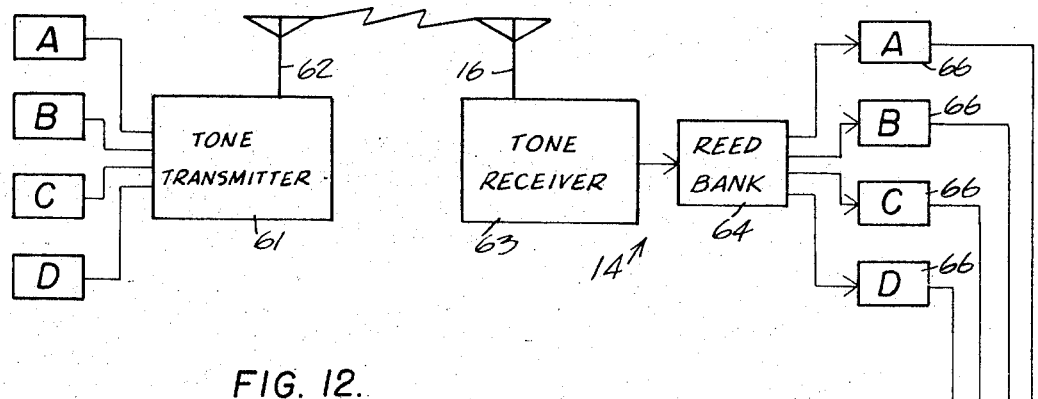
FIG. 12 is a wiring diagram showing the manner of remote control combined with another wiring diagram showing its relation to the control devices on the unit.

The receiver control unit 14 includes the elements shown on the right hand side of FIG. 12 in the wiring diagram. The left hand side of FIG. 12 illustrates the controls for transmission. The type of circuit illustrated herein includes a tone transmitter 61 which sends out a series of different tones or notes each riding on the transmitter's original frequency or carrier wave. To the tone transmitter are connected tone generators A, B, C and D. The controller controls by generating a certain combination of tones. This is performed by the usual push buttons or switches closing the circuit of the selected tone generator and connecting that tone generator to the transmitter 61. The particular tone is transmitted from the sending antenna 62. In the control receiver 14 there is a tone receiver 63 and also a reed bank 64 which contains several reeds so that when a certain combination of tones is transmitted the respective reeds of these tones in the receiver will respond and vibrate according to the frequency received. The vibration of the reeds of the right tone closes an electric circuit which actuates suitable transistorized relayless servo switches 66 indicated by the letters A, B, C and D, corresponding to the respective tone generators, A, B, C and D. The selected switch closes the circuit to the respective servo motor. For instance, in this illustration, the tone generator A actuates the switch A which in turn closes the circuit of servo A which operates the switch 67 to close the circuit to servo motor 53 which turns gear transmission 68 to turn the 3-way valve 46 into the respective positions for closing, transmitting to the by-pass, or opening to the feed and spray pipes.

The operating of the tone generator D will transmit the proper vibration to close the servo switch 66 B which closes the circuit to the servo motor B for manipulating the throttle 69 of the engine 8. The circuits C and D indicate the same kind of servo control for other accessories that may be needed on the apparatus.

FIG. 7 illustrates the flexibility of control. For instance, the system of furrows may be separated into groups if the force of the spraying is sufficient to spray through between certain types of plants for more than the adjacent two rows of plants. In such instance the unit would follow the furrow and then would steer itself along a bank 71 and skip several furrows until it reached another steering bank 72 and turn into the adjacent furrow. At the end of that furrow another steering bank 73 would steer the unit so as to skip several furrows and until it reaches another steering bank 74 into another selected furrow. In this manner by putting in the various steering banks at the ends of the rows of furrows, a flexibility of operation is accomplished according to the density of the foliage.

It is critical of this invention that the driving unit 6 and the spraying unit 7 both be sufficiently low to pass in and along the furrow 3 without damaging the leaves or branches of the low bushes or plants for the use of which this apparatus is contemplated, and also the proportions of the length and width of the units be such as to lend stability for maintaining the direction of travel along the furrow, yet be adapted for rapid correction of misalignment or for rapid steering. Another critical part of this invention is to be adapted for remote control because in carrying out the particular purpose of this invention no space is provided in the tunnels 2 above the furrows 3 for an operator on the vehicle.

I claim:

1. Means for dispensing a treating substance to rows of low growing plants forming a relatively low tunnel above a furrow, comprising a traction vehicle of a height and width less than the height and width of said low tunnel, propelling means on said traction vehicle to propel the same through said tunnel, dispensing means of dimensions less than the dimension of said tunnel for dispensing said treating substance under pressure toward the plants about said tunnel, electrically actuated means for controlling said propelling means on said vehicle, being adapted to be controlled remotely, electrically actuated means for controlling said dispensing means, being adapted to be operated by remote control, remote control means to transmit electrical actuation to the respective electrically actuated means at will, said dispensing means including spraying means directing sprays laterally and upwardly to the plants along opposite sides of said furrow.

2. The invention specified in claim 1, and means on said traction vehicle coacting with the sides of said tunnel and the banks of said furrow for steering said traction vehicle along said furrow and said tunnel.

3. The invention specified in claim 2, and said steering means including, at least one pivoted castored wheel on said traction vehicle, and feeler extensions connected to said wheel so as to turn said wheel when said extension contacts a plant or a side of said furrow so as to turn said wheel toward the middle of said furrow.

4. The invention specified in claim 3, and said extension extending to a distance at least equal to the length of said traction vehicle and dispenser means.

5. The invention specified in claim 4, and said traction vehicle and said dispenser being elongated to a length several times the width of the space between the adjacent rows of plants.

6. The invention specified in claim 5, and abutment means extended forward from said traction vehicle inclined upwardly and forward to raise said traction vehicle when abutting an obstruction thereby to aid said traction vehicle to ride over said obstacle.

7. The invention specified in claim 1, and each of said electrically actuated means including a servo motor, a servo switch for each servo motor, said remote control means including tone generators of different frequencies, receivers at the switches tuned to the respective tone generators, and circuit closing means for the respective tone generators selectively operable for actuation of the respective servo motors.

* * * * *